(12) United States Patent
Rinderer

(10) Patent No.: US 6,340,141 B1
(45) Date of Patent: Jan. 22, 2002

(54) CABLE SUPPORT SYSTEMS, METHODS, AND RACK THEREFOR

(75) Inventor: Eric R. Rinderer, Highland, IL (US)

(73) Assignee: Cooper Technologies Company, Houston, TX (US)

(*) Notice: Subject to any disclaimer, the term of this patent is extended or adjusted under 35 U.S.C. 154(b) by 318 days.

(21) Appl. No.: 08/871,923

(22) Filed: Jun. 10, 1997

(51) Int. Cl.[7] .................................................. F16L 3/00
(52) U.S. Cl. ........................ 248/49; 248/68.1; 248/58; 248/73; 211/26
(58) Field of Search ...................... 248/49, 68.1, 174, 248/73, 58; 211/26, 189

(56) References Cited

U.S. PATENT DOCUMENTS

| | | | |
|---|---|---|---|
| 1,818,602 A | 8/1931 | Bowly | |
| 2,891,750 A | 6/1959 | Bergquist | 248/58 |
| 3,035,800 A * | 5/1962 | McLeod | 248/68 |
| 3,042,351 A * | 7/1962 | Du Bois | 248/49 |
| 3,053,358 A * | 9/1962 | Gross | 189/36 |
| 3,281,005 A * | 10/1966 | Schumacher | 220/308 |
| 3,351,699 A * | 11/1967 | Merckle | 174/35 |
| 3,406,932 A * | 10/1968 | Burke | 248/68 |
| 3,598,349 A | 8/1971 | Drake | 248/49 |
| 3,713,613 A | 1/1973 | Searls | 248/49 |
| 3,948,473 A | 4/1976 | Mason | 248/49 |
| 4,232,845 A * | 11/1980 | Turner | 248/49 |
| 4,765,576 A | 8/1988 | Peled | 248/49 |
| D308,479 S | 6/1990 | Cassity | D8/380 |
| 5,062,605 A | 11/1991 | Muhlethaler | 248/68.1 |
| 5,465,929 A * | 11/1995 | Dooley | 248/681 |
| 5,470,021 A * | 11/1995 | Looney | 248/49 |
| 5,531,410 A | 7/1996 | Simon | 248/49 |

* cited by examiner

Primary Examiner—Anita King
Assistant Examiner—Kimberly Wood
(74) Attorney, Agent, or Firm—Senniger, Powers, Leavitt & Roedel

(57) ABSTRACT

A cable support system comprising a series of elongate racks connected together end-to-end, each rack having upper and lower metal tubes of circular cross-section extending longitudinally at the sides thereof, stamped sheet metal cross-members extending between the lower tubes, and stamped sheet metal side members extending between the upper and lower tubes at each side of the rack, a method of constructing the support with a change in direction, and a method of supporting cable with the cable enclosed in components of the racks.

32 Claims, 16 Drawing Sheets

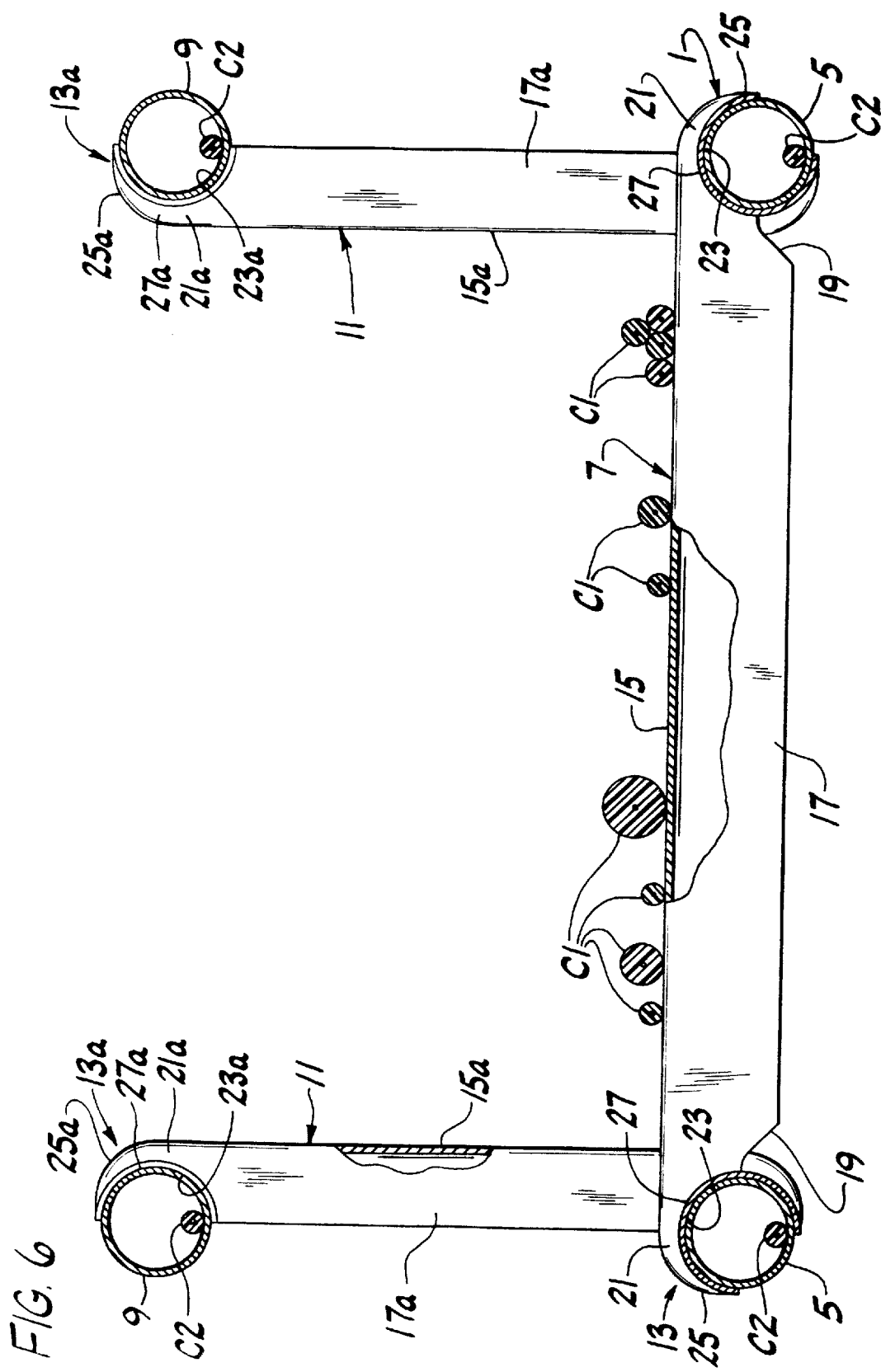

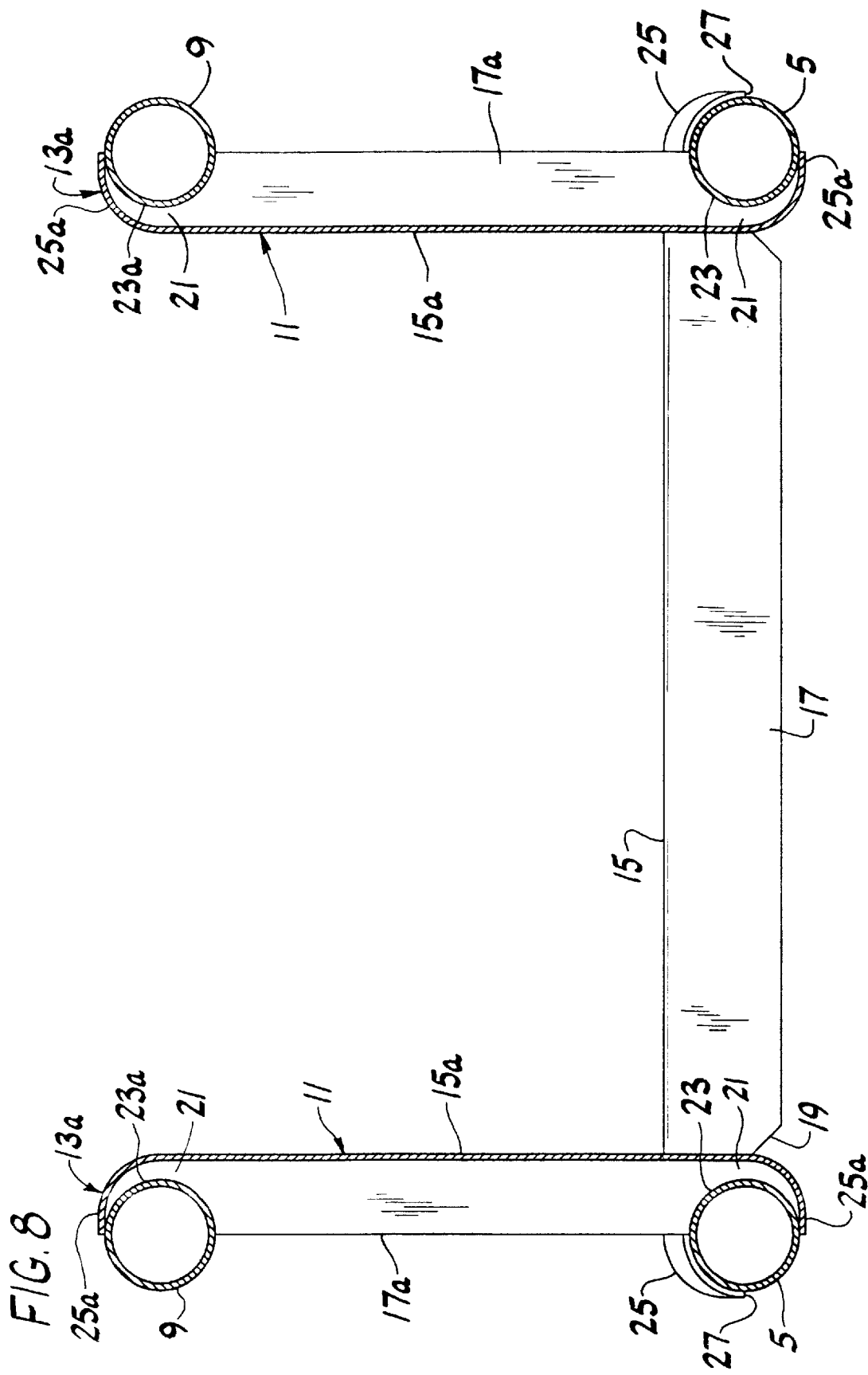

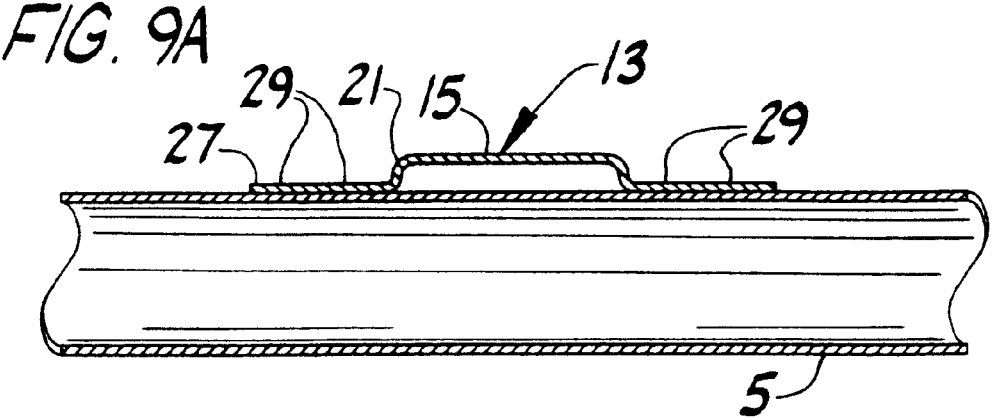
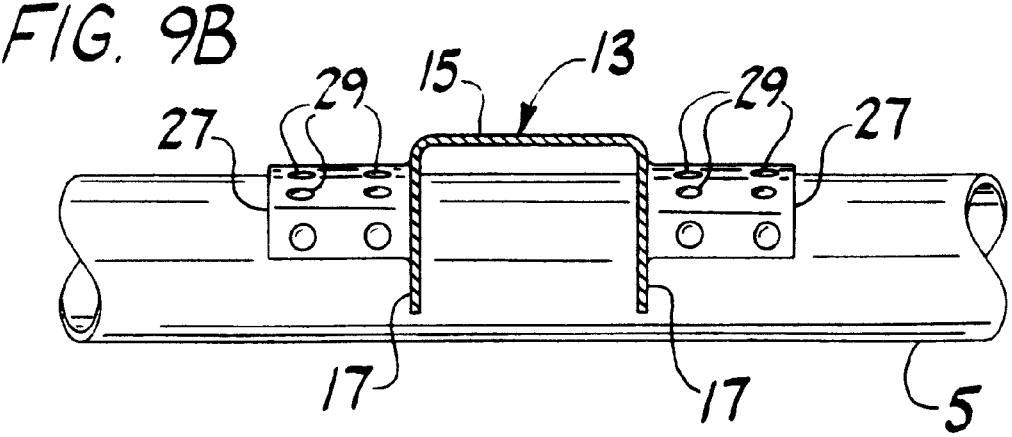
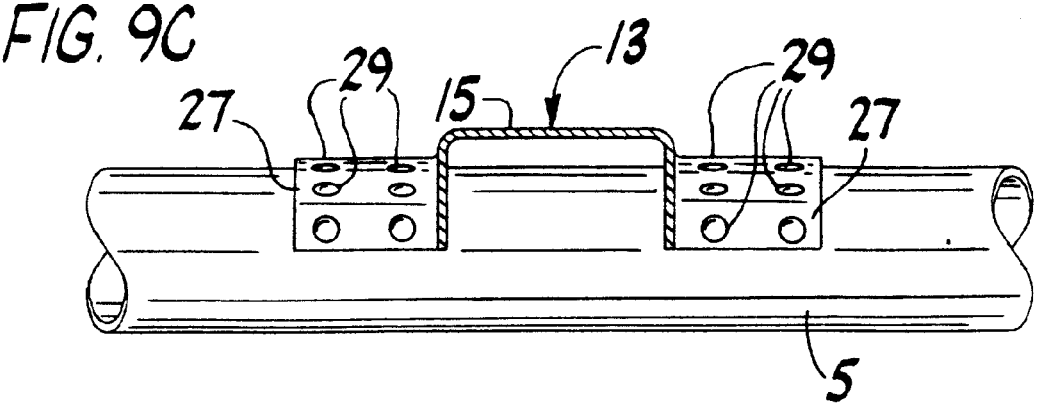

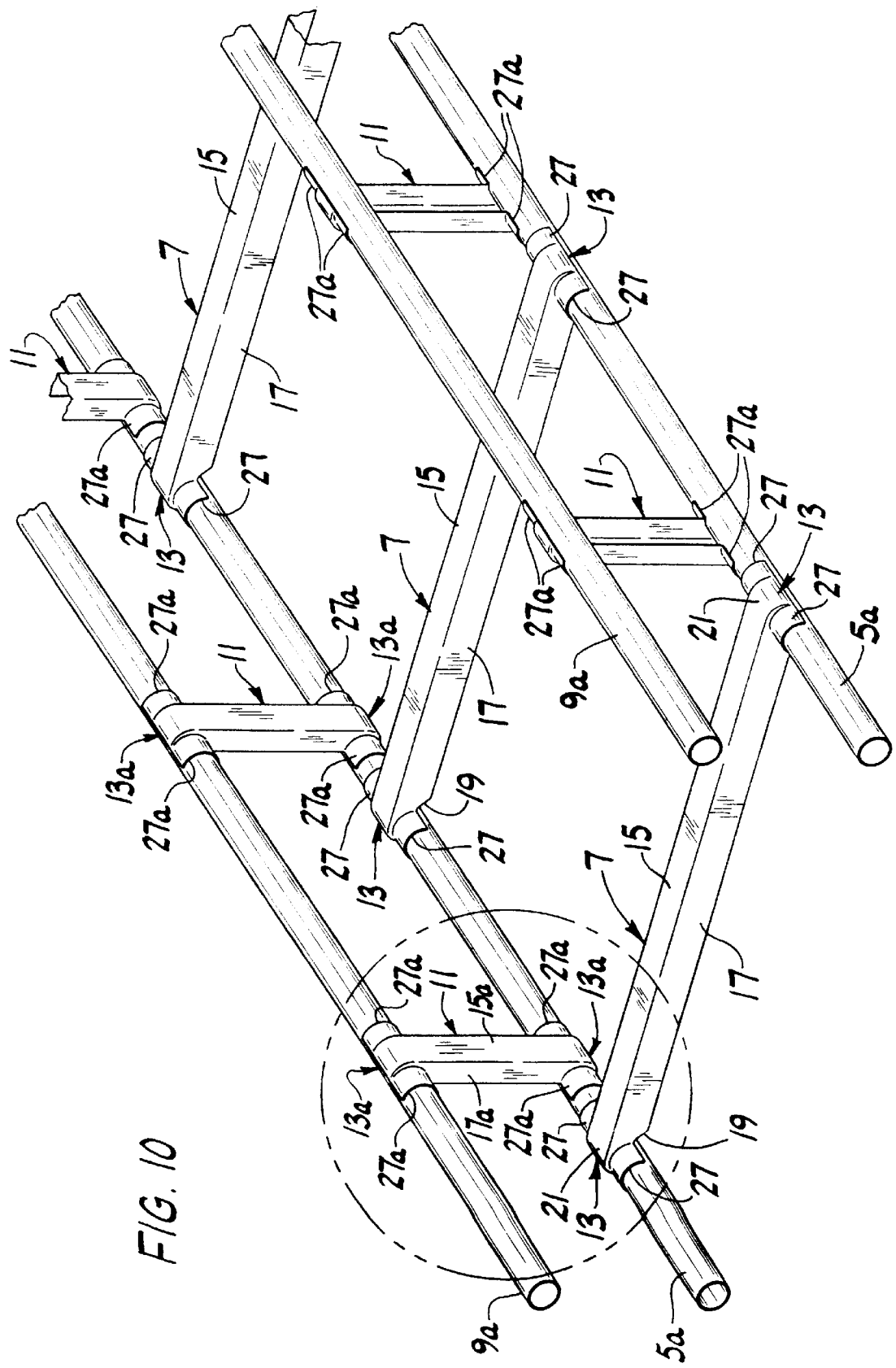

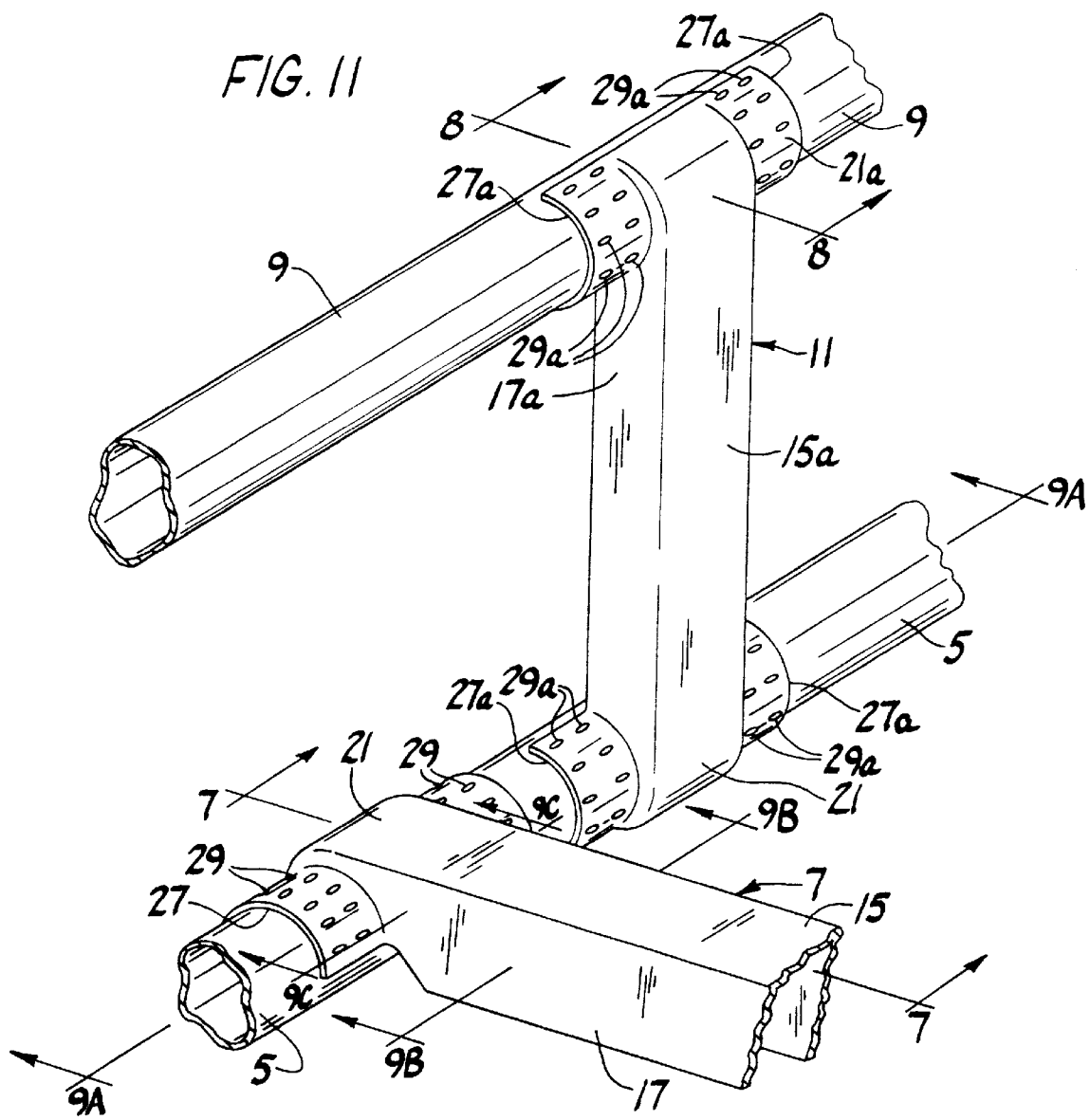

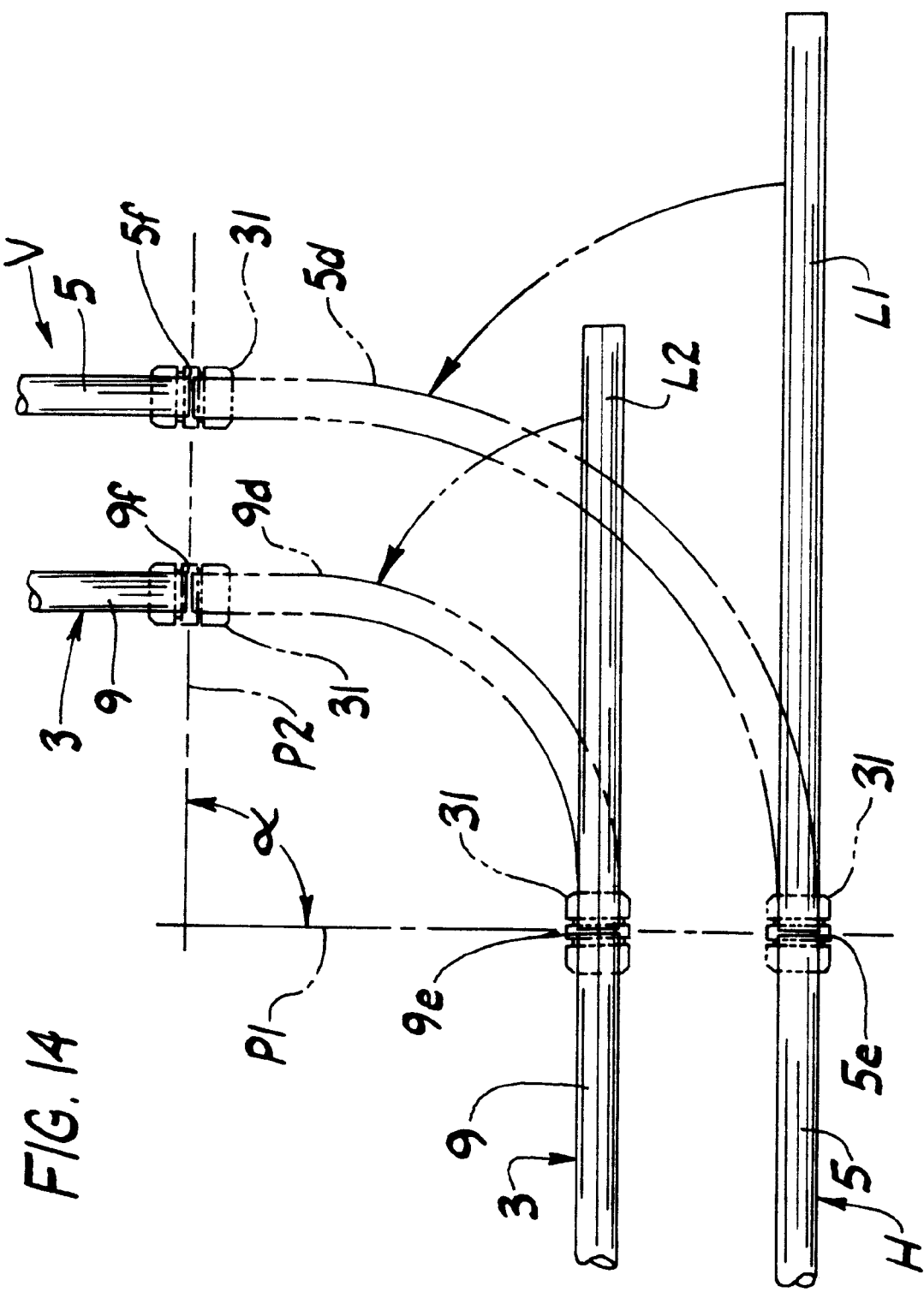

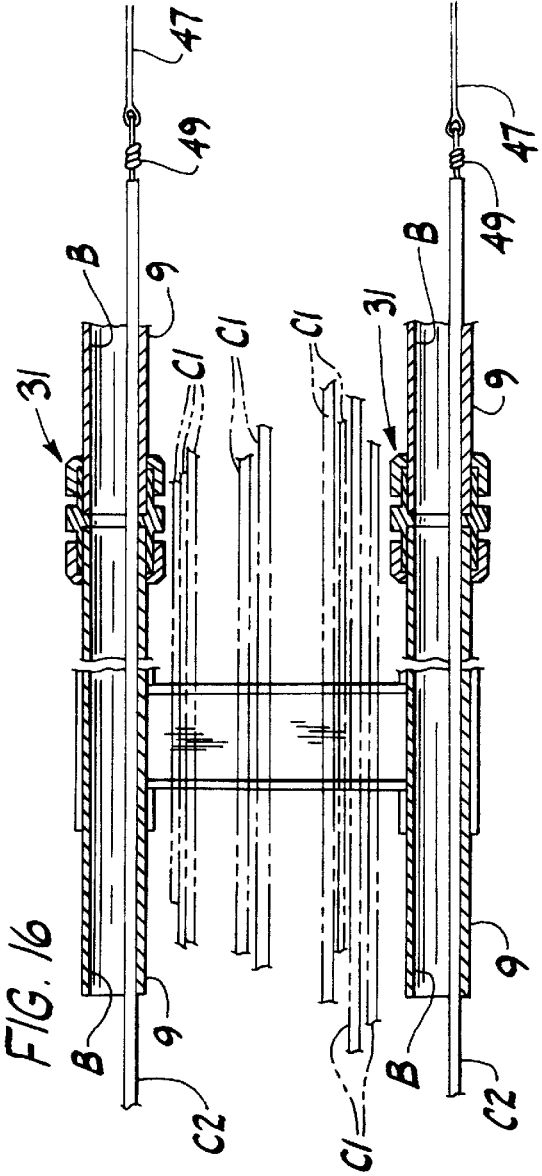

CABLE SUPPORT SYSTEMS, METHODS, AND RACK THEREFOR

BRIEF SUMMARY OF THE INVENTION

This invention relates to cable support systems, and methods of construction and utilization thereof, and more particularly to a support system for electrical cables comprising a series of elongate racks connected together end-to-end, and to a rack per se.

The system of this invention is in the same general class as the cable support system shown in U.S. Pat. No. 2,891,750 entitled Cable Supporting System comprising racks of wire construction connected together end-to-end by having the wires constituting the lower side members or stringers and the upper wire members or stringers of each rack formed with eyes receiving bolts threaded in nuts welded under the lower eyes.

Among the several objects of this invention may be noted the provision of a support for electrical cables of the same general class comprising a series of racks connected together end-to-end, and the provision of racks for assembly thereof to constitute the support, with the racks and the system constructed from the racks of relatively light weight, the racks being formed of relatively light weight components which are economical to provide and the racks being relatively easy to assemble end-to-end for minimizing the cost of assembly; and the provision of such a light-weight support and light-weight racks thereof adapted adequately to support the load of a plurality of cables without undue deflection and adapted for installation with quick and easy assembly of racks end-to-end; the provision of such a support adapted for supporting cable (such as fire alarm cable) with the cable protected; the provision of a method of efficiently and economically constructing a support utilizing such racks with the support having a change in direction (a bend) for change in direction of cable supported thereby; and the provision of a method of supporting electrical cable with cable laid in cable-supporting racks and with cable enclosed in a component of the racks for dual utilization of the racks.

In general, the invention involves a support for electrical cable comprising a series of elongate racks connected together end-to-end, each rack comprising a pair of elongate lower members extending in parallel spaced relation longitudinally with respect to the rack at opposite sides thereof and cross-members extending transversely with respect to the rack between the lower longitudinal members spaced at intervals along the length of the rack and holding the lower members in their said parallel spaced relation, the cross-members serving to support cable laid thereon. Each rack further comprises a pair of elongate upper members extending in parallel spaced relation longitudinally with respect to the rack above the lower members, and side members extending between the lower and upper longitudinal members spaced at intervals along the length of the rack and holding said upper members in parallel relation to the lower members spaced above the lower members. Each of said lower and upper longitudinal members comprises a metal tube of circular cross-section. Each of said cross-members is an elongate sheet metal member having a reach extending between the lower tubes formed so as to be stiffened against bending and having formations at each end thereof with a part-circular contour fitted on and secured to the lower longitudinal members. The side members and upper tubes form railings at opposite sides of the rack for retaining cable on the cross-members. The racks are interconnected end-to-end by means of couplings which couple together meeting ends of at least some of the tubes of successive racks in the series. The invention also involves the rack per se.

The aforesaid method of constructing a support generally involves the placement of a first and a second rack of the support in coplanar position with the first extending in a first direction and the second extending in a second direction diverging from the first, each rack comprising a pair of elongate lower members extending in parallel spaced relation longitudinally with respect to the rack at opposite sides thereof; cross-members extending transversely with respect to the rack between said lower longitudinal members spaced at intervals along the length of the rack and holding said lower members in said parallel spaced relation, said cross-members serving to support cable laid thereon, a pair of elongate upper members extending in parallel spaced relation longitudinally with respect to the rack above the said lower members, side members extending between the lower and upper longitudinal members spaced at intervals along the length of the rack and holding said upper members in parallel relation to the lower members spaced above the lower members; each of said lower and upper longitudinal members comprising a metal tube, the ends of the tubes of the first rack at one end thereof lying generally in a first plane transverse to the first rack and the ends of the tubes of the second rack at one end thereof lying generally in a second plane transverse to the second rack, said planes intersecting at said angle, bending metal tubes of the same cross-section as the tubes of the racks to form tubular connections between said ends of at least two of the tubes of said first and second racks, coupling the ends of the tubular connections to said ends of the tubes of said first and second racks which they are to interconnect.

The aforesaid method of supporting electrical cable generally involves preparing a support comprising a series of elongate racks each comprising a pair of elongate lower members extending in parallel spaced relation longitudinally with respect to the rack at opposite sides thereof; cross-members extending transversely with respect to the rack between said lower longitudinal members spaced at intervals along the length of the rack and holding said lower members in said parallel spaced relation, said cross-members serving to support cable laid thereon, a pair of elongate upper members extending in parallel spaced relation longitudinally with respect to the rack above the said lower members, side members extending between the lower and upper longitudinal members spaced at intervals along the length of the rack and holding said upper members in parallel relation to the lower members spaced above the lower members; each of said lower and upper longitudinal members comprising a metal tube, the racks being interconnected in end-to-end relation by couplings which couple together meeting ends of certain tubes, the couplings being free of obstruction to the bores of the tubes, the method comprising laying cable on the cross-members of the racks, and inserting cable in one or more of the coupled-together tubes which extends throughout the length of the support, the inserted cable extending longitudinally therethrough as permitted by nonobstruction of the bores of the tubes by the couplings.

Other objects and features will be in part apparent and in part pointed out hereinafter.

BRIEF DESCRIPTION OF THE DRAWINGS

FIG. 6 is an enlarged transverse section on the vertical plane including line 6—6 of FIG. 2;

FIG. 8 is an enlarged transverse section on the vertical plane including line 8—8 of FIGS. 2 and 11;

FIGS. 9A, 9B and 9C are sections on lines 9A—9A, 9B—9B and 9C—9C, respectively, of FIG. 11;

FIG. 10 is an enlarged fragment of FIG. 1, more particularly a view of one end of a rack;

FIG. 11 is an enlarged fragment of FIG. 10;

FIG. 14 is a view illustrating the aforesaid method of constructing the support with the direction change; and FIGS. 15 and 16 are views illustrating steps involved in the aforesaid method of supporting electrical cable.

Corresponding reference characters indicate corresponding parts throughout the drawings.

DETAILED DESCRIPTION

Figure 1:
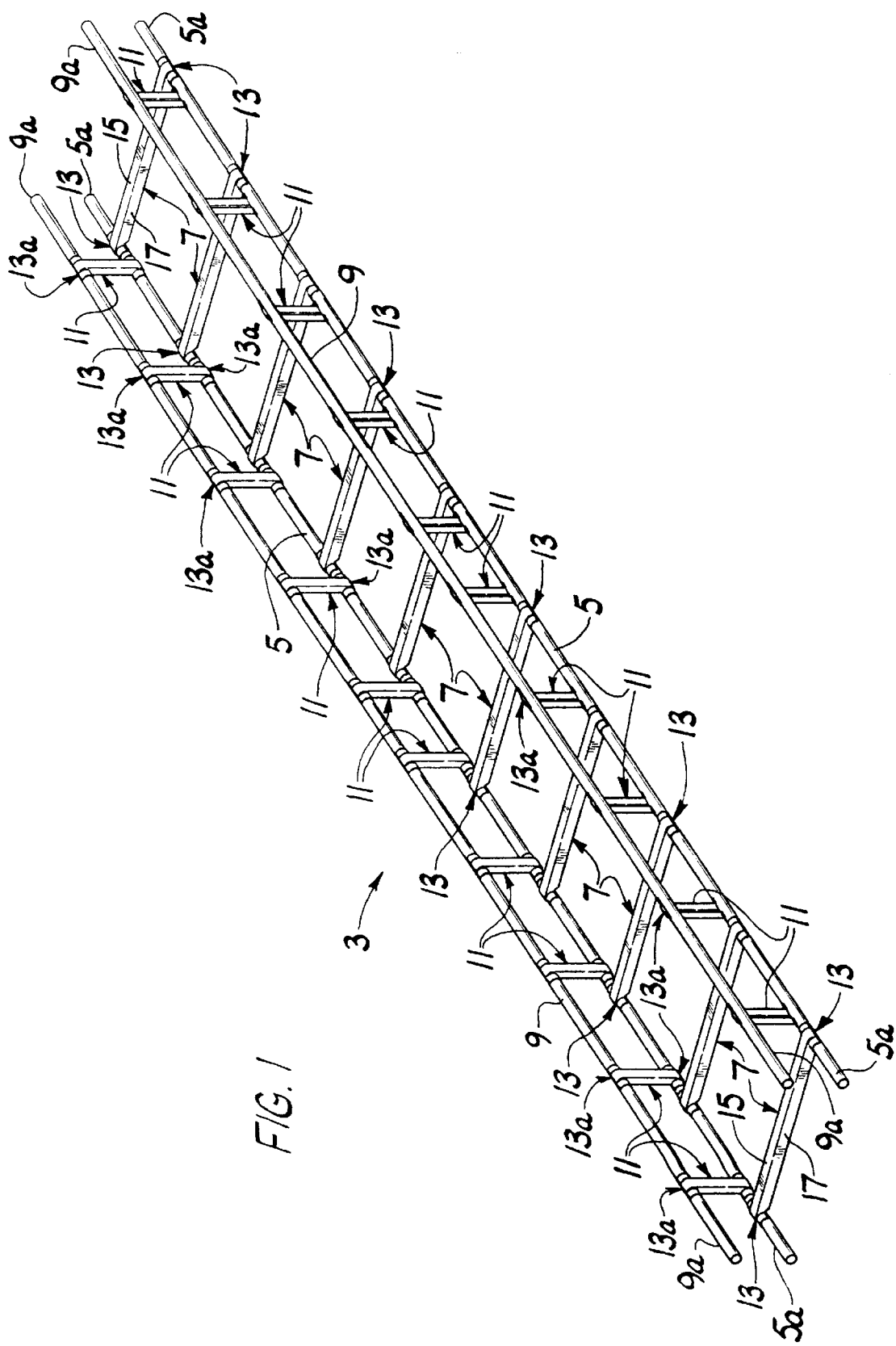
FIG. 1 is a perspective of a rack per se for a cable support of this invention, the cable support comprising a series of the racks connected together end-to-end.
Figure 2:
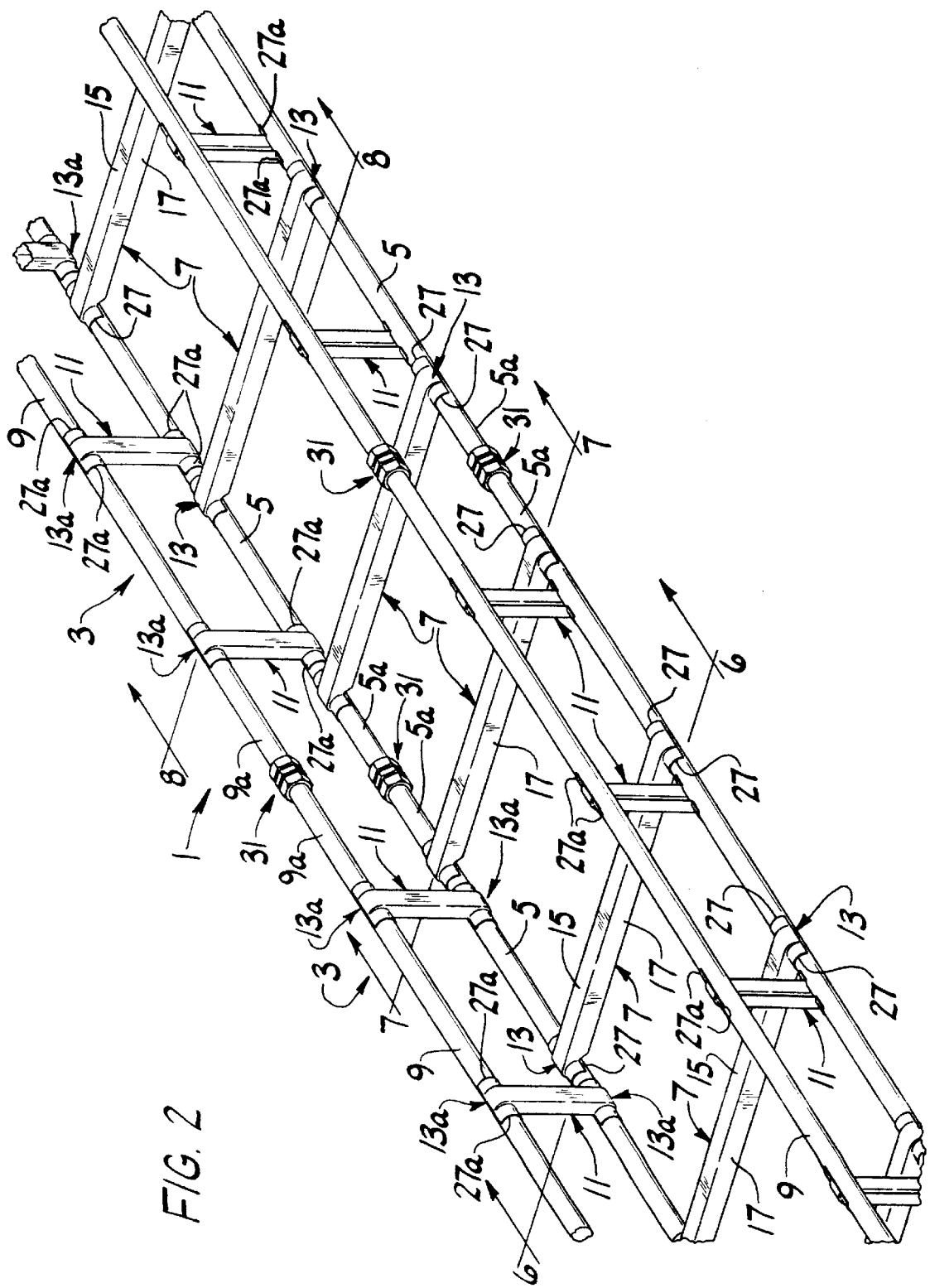
FIG. 2 is a perspective on a larger scale than FIG. 1 showing the end-to-end connection of two racks in a series.
Figure 3:
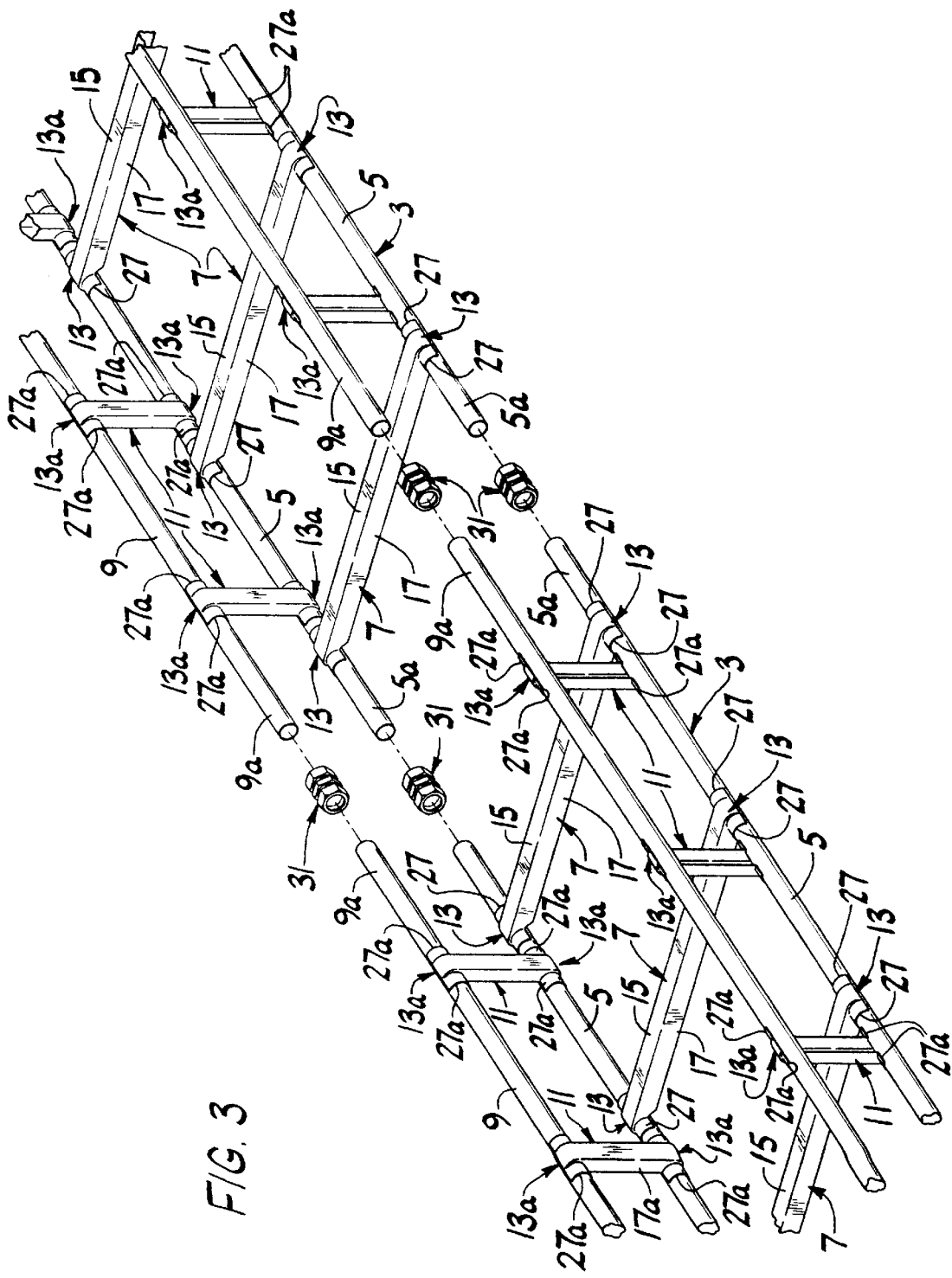
FIG. 3 is an exploded view of the construction shown in FIG. 2.
Figure 4:
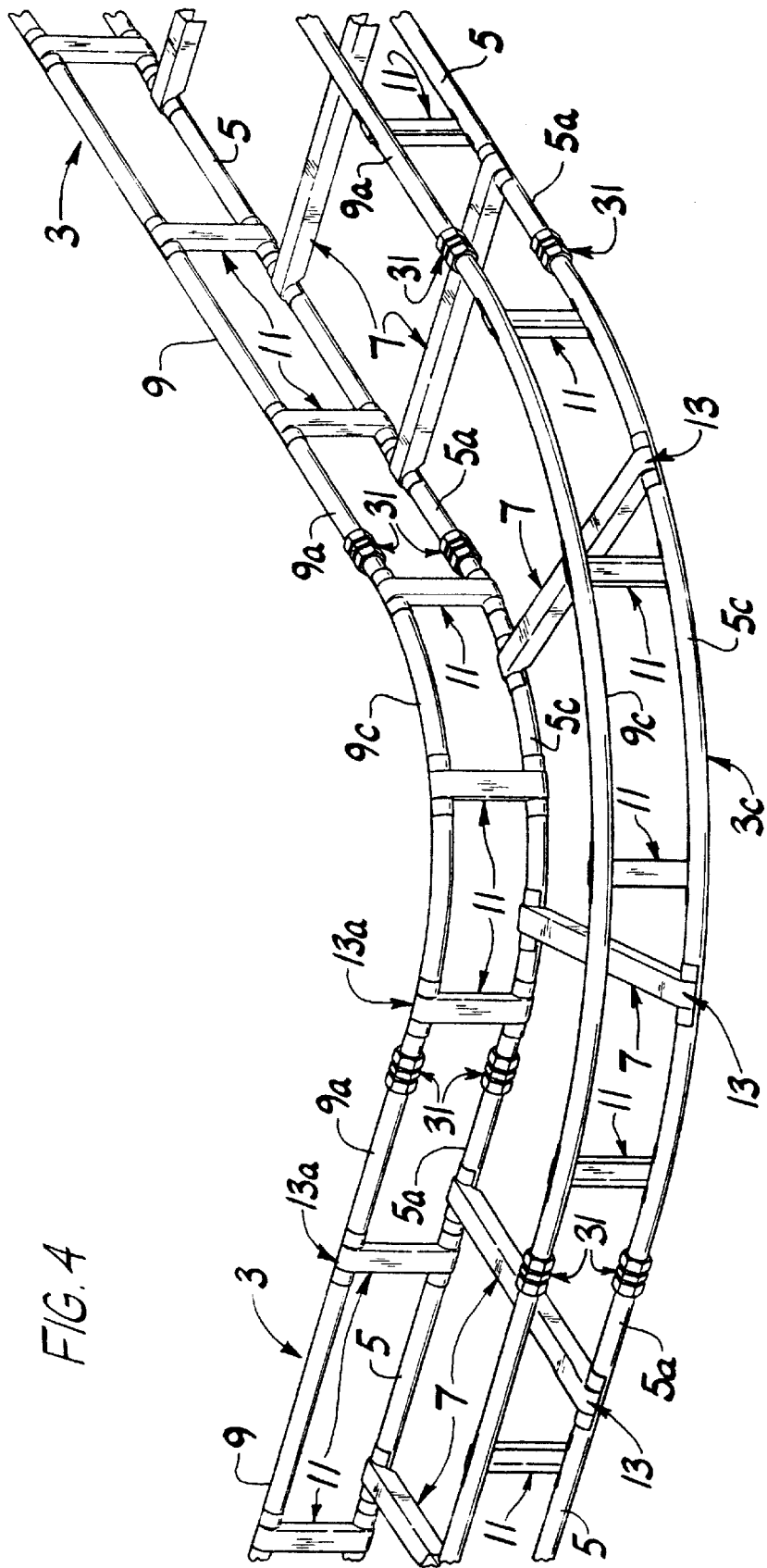
FIG. 4 is a perspective showing a horizontal support structure including a curved rack in series between two straight racks.

Referring to the drawings, a support of this invention for electrical cable is shown in part in FIG. 2 and designated 1 in its entirety. The support comprises a series of elongate racks, one of which is shown per se in FIG. 1 and designated 3 in its entirety. Only two racks are shown in FIG. 2 because of space limitations, and it will be readily understood that the support may comprise more than two racks connected together in series end-to-end, and may include a curved rack such as shown in FIG. 4 (to be subsequently described) or a plurality of curved racks.

Each rack 3 comprises a pair of elongate lower members each designated 5 extending in parallel spaced relation longitudinally with respect to the rack at opposite sides thereof and cross-members each designated 7 extending transversely with respect to the rack between the lower longitudinal members 5 spaced at intervals along the length of the rack and holding the lower members 5 in their parallel spaced relation. The cross-members 7 serve to support cable (not shown) laid thereon. Each rack 3 further comprises a pair of elongate upper members each designated 9 extending in parallel spaced relation longitudinally with respect to the rack above the lower members 5, and side members each designated 11 extending between the lower and upper longitudinal members 5 and 9 at spaced intervals along the length of the rack and holding the upper members 9 in parallel relation to the lower members 5 spaced above the lower members.

Each of the two lower and two upper longitudinal members 5 and 9 comprises a metal tube of circular cross-section, e.g. a length of zinc-plated steel tubing of the type used as electrical conduit, having a 0.922 inch outside diameter (O.D.) and a 0.824 inch inside diameter (I.D.), thus having a wall thickness of 0.098 inch. In a typical embodiment of a straight rack 3 such as shown per se in FIG. 1, each tube 5 and each tube 9 is ten feet long, making the rack ten feet long, the rack being twelve inches wide and four inches deep. It is contemplated that the tubes may have an O.D. within the range of 0.706 to 1.163 inch corresponding to standard electrical conduit.

Figure 6A:
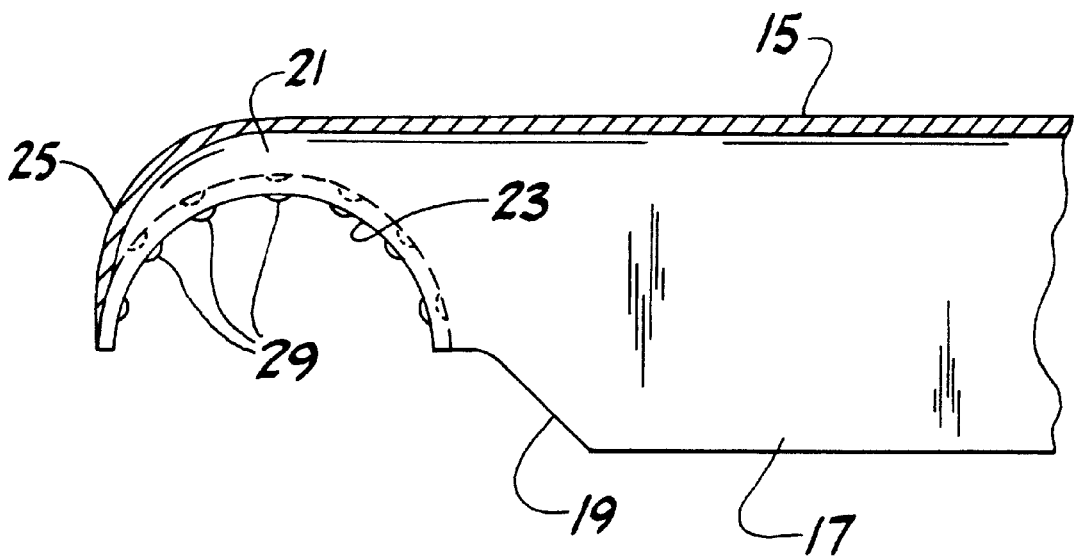
FIG. 6A is a view in section of one end of a cross-member of the rack.
Figure 6B:
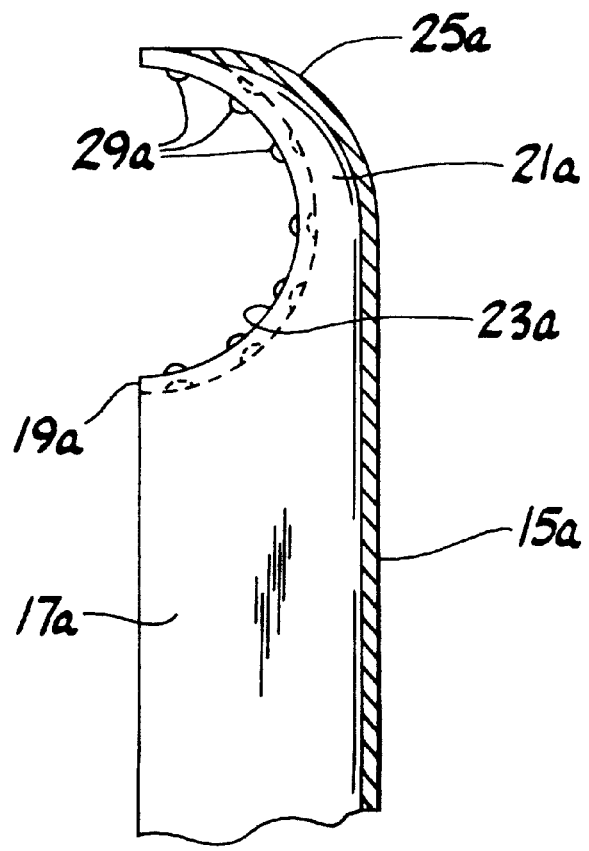
FIG. 6B is a view in section of the upper end of a side member of the rack.
Figure 7:
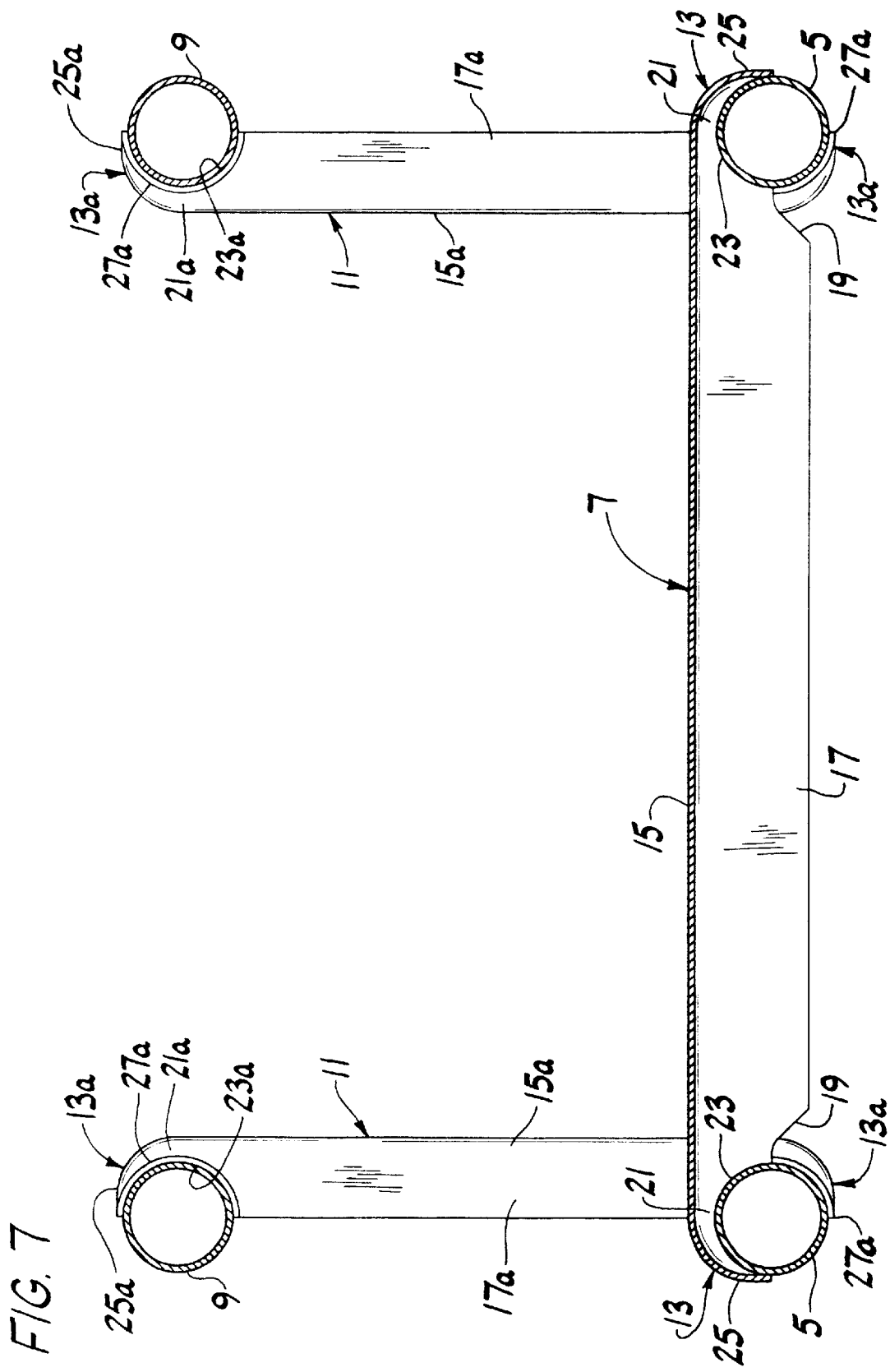
FIG. 7 is an enlarged transverse section on the vertical plane including line 7—7 of FIGS. 2 and 11.
Figure 12A:
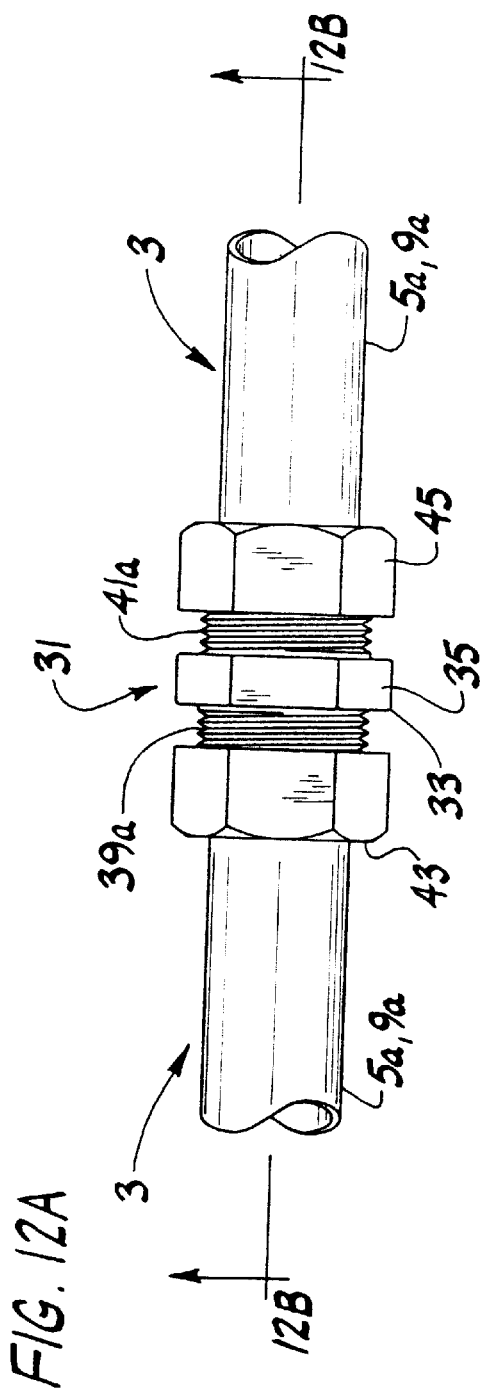
FIG. 12A is a view of an end-to-end connection of two members of two racks.
Figure 12B:
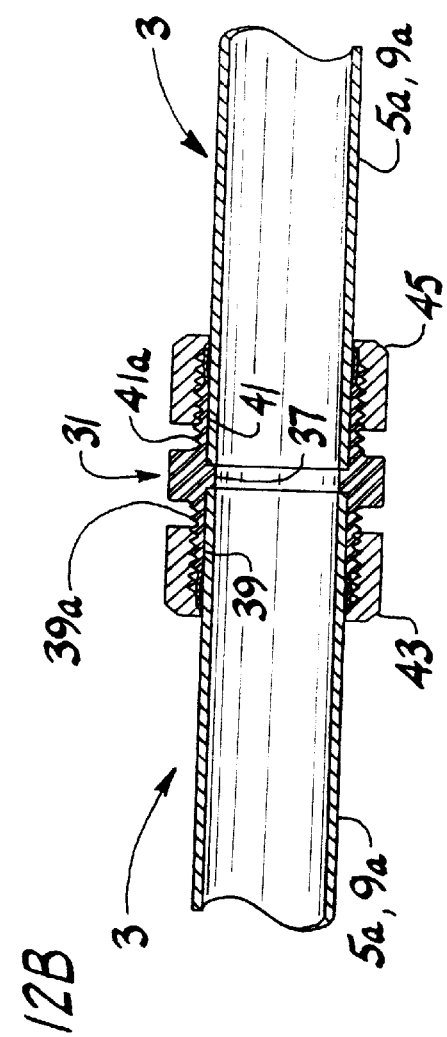
FIG. 12B is a longitudinal section of FIG. 12A on line 12B—12B of FIG. 12A.

Each of the cross-members 7 is a stamped elongate sheet metal member, e.g. of 22 gauge sheet steel, having a reach extending between the lower members 5 formed so as to be stiffened against bending and having formations such as indicated in their entirety at 13 at each end thereof fitted on and secured to the members 5. Specifically, each cross-member is an elongate sheet metal member of channel shape in cross section thereby having a web 15 and side flanges 17. The side flanges are in effect cut away at each end as indicated at 19 so that each flange has a narrowed upper end portion 21 formed with a downwardly opening recess 23 of part circular shape (generally semi-circular shape) corresponding to the circular cross section of the lower longitudinal tubes 5 (FIGS. 6 and 7). The web of the channel is bent down at each end of the cross-member as indicated at 25. Further, each cross-member 7 has wings each designated 27 formed integrally therewith of the sheet metal thereof extending laterally outwardly therefrom at each end thereof bounding the downwardly opening recesses 23, these wings being curved in correspondence with the recesses 23 in the flanges 17 of the cross-member. Each of the channel-section cross-members 7 extends between the lower tubes 5, holding them in their parallel spaced relation, with the web 15 of each member 7 uppermost and the flanges 17 of each member 7 extending downward, thus presenting the flat upper surfaces of the members 7 for laying cable thereon without exposure of the cable to relatively sharp edges. The cross-members 7 at their ends extend over (above) the lower tubes 5, interfitting therewith at the recesses 23, and are suitably secured at their ends to the lower tubes 5 as by projection welding the wings 27 to the lower tubes as indicated at 29 in FIGS. 9A–9C. Other modes of securement may be used.

The side members 11 are similar to the cross-members 7, each being a stamped elongate sheet metal member, e.g. of 22 gauge sheet steel, having a reach extending between members 5 and 9 formed so as to be stiffened against bending and having formations such as indicated in their entirety at 13a at each end thereof fitted on and secured to the members 5 and 9 (FIG. 8). Specifically, each side member is an elongate sheet metal member of channel shape in cross section thereby having a web 15a and side flanges 17a. The side flanges are in effect cut away at each end as indicated at 19a (FIG. 6B) so that each flange has a narrowed upper end portion 21a formed with an outwardly opening recess 23a of part circular shape (generally semi-circular shape) corresponding to the circular cross section of the tubes 5. The web of the channel is bent over at each end of the side member as indicated at 25a. Further, each cross-member 7 has wings each designated 27a formed integrally therewith of the sheet metal thereof extending laterally outwardly therefrom at each end thereof bounding the outwardly opening recesses 23a, these wings being curved in correspondence with the recesses 23a in the flanges 17a of the side member (FIGS. 10 and 11). Each of the channel-section side members 11 extends between the respective lower tube 5 and upper tube 9, holding them in their parallel vertically spaced relation, with the web 15a of each side member 11 innermost and the flanges 17a of each side member 11 extending outward, thus presenting the flat external surfaces of the webs of the side members toward cable laid in the rack without exposure of the cable to relatively sharp edges. The side members 11 at their lower and upper ends extend on the inside of the lower tubes 5 and the upper tubes 9, interfitting therewith at the recesses 23a, and are suitably secured at their ends to the tubes as by projection welding the wings 27a to the tubes as indicated at 29a (FIGS. 6A and 6B). Other modes of securement may be used.

As illustrated in FIGS. 2, 3, 12A and 12B, a plurality of racks 3 are assembled to constitute an elongate support 1 for electrical cable with the racks interconnected end-to-end in series by means of couplings 31 which couple together meeting ends of the tubes 5 and 9 of successive racks in the series. The racks are fabricated with the tubes 5 and 9 extending beyond the end cross-members 7 of the series of cross-members and the end side members 11 of the series of side members, the extending ends of the tubes being indicated at 5a and 9a. As illustrated, the couplings 31 are of the type comprising a central ring 33 having a hexagonal exterior 35 for application of a wrench to hold it from rotating and an internal annular flange 37, sleeves 39 and 41 extending coaxially from both sides of the ring each having a tapered threaded exterior surface as indicated at 39a, 41a and hexagonal nuts 43 and 45 threaded on the sleeves. The interconnections are made with the nuts 43 and 45 of each coupling backed off from the central ring so that the sleeves 39 and 41 are in an expanded condition by inserting the ends of the two tubes which are to meet in the sleeves to the point where they engage the flange 37, then tightening the nuts to contract the sleeves and thereby tighten them on the end portions of the tubes. It will be understood that other types of couplings may be used. It will be further understood that the invention involves a construction wherein only at least some, but not all of the tubes 5 and 9 are coupled together, e.g. only tubes 5 of successive racks or only tubes 9 of successive racks. It will be understood that this phase of the invention may involve a method wherein only at least two but not all of the tubes 5 and 9 may be interconnected, e.g. only tubes 5 of successive racks may be interconnected by bent lengths L1.

Referring to FIG. 4, there is shown a curved rack designated in its entirety by the reference character 3c comprising curved lower members 5c corresponding to members 5 of the straight rack 3 described above, curved upper members 9c corresponding to members 9 of the straight rack, and cross-members 7 and side members 11 the same as in the straight rack. The curved rack is shown as assembled to form a horizontal support la with direction change comprising a first straight rack 3, the curved rack 3c and a second straight rack 3 connected in series by couplings 31. The curved rack may have a 90° or other curvature.

Figure 5:
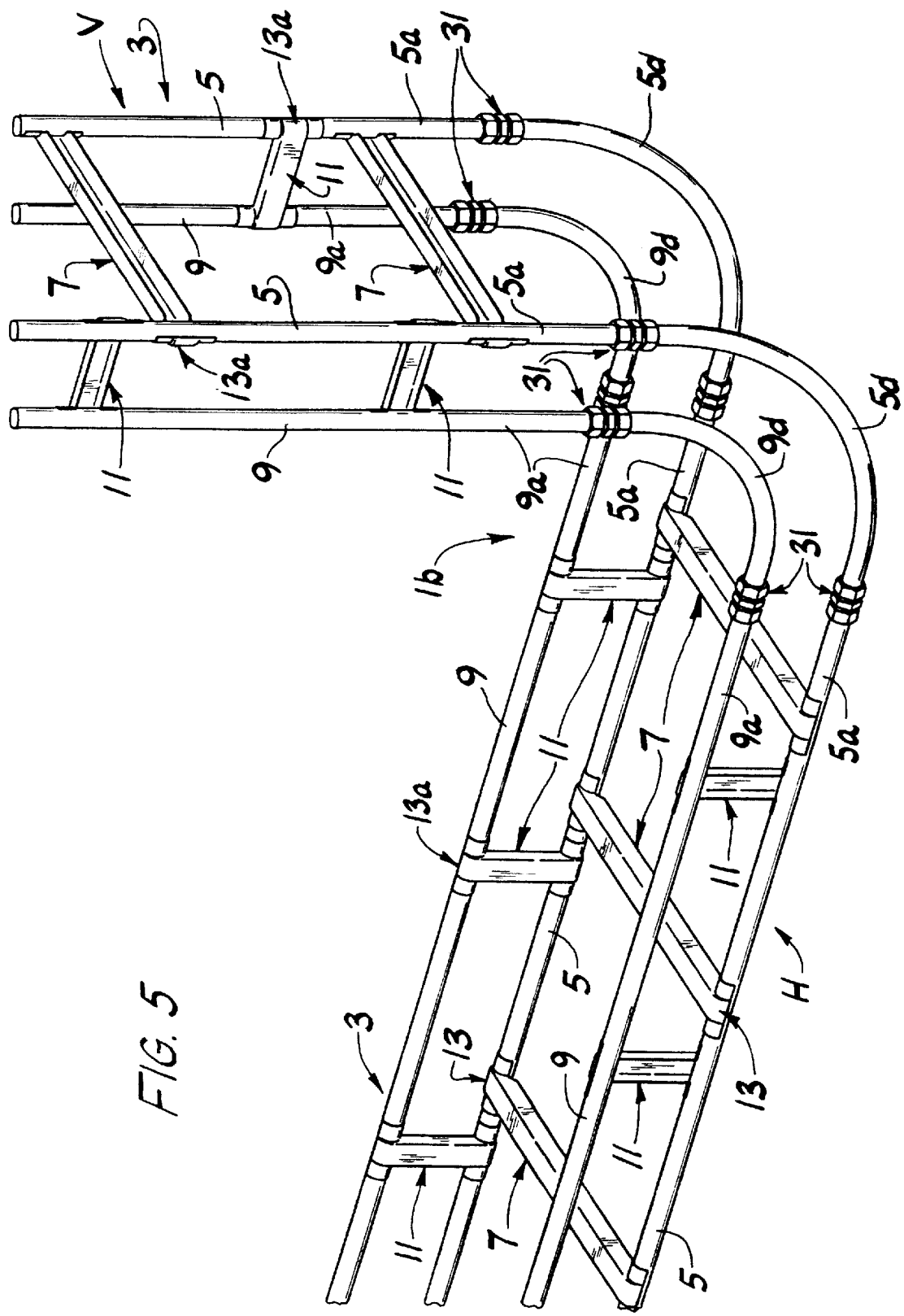
FIG. 5 is a perspective showing a support structure including a horizontal rack, upwardly curving members and a vertically extending rack in series.

Referring to FIG. 5, there is shown a support designated 1b constructed with a straight rack 3 extending horizontally as indicated at H and another straight rack 3 extending vertically as indicated at V with 90° curved tubes 5d and 9d forming the transition from the horizontal rack to the vertical rack. The curved tubes 5d and 9d are interconnected end-to-end with the respective tubes 5 and 9 of the horizontal and vertical racks by couplings 31. It will be understood that tubes with other than 90° curvature may be used.

Figure 13:
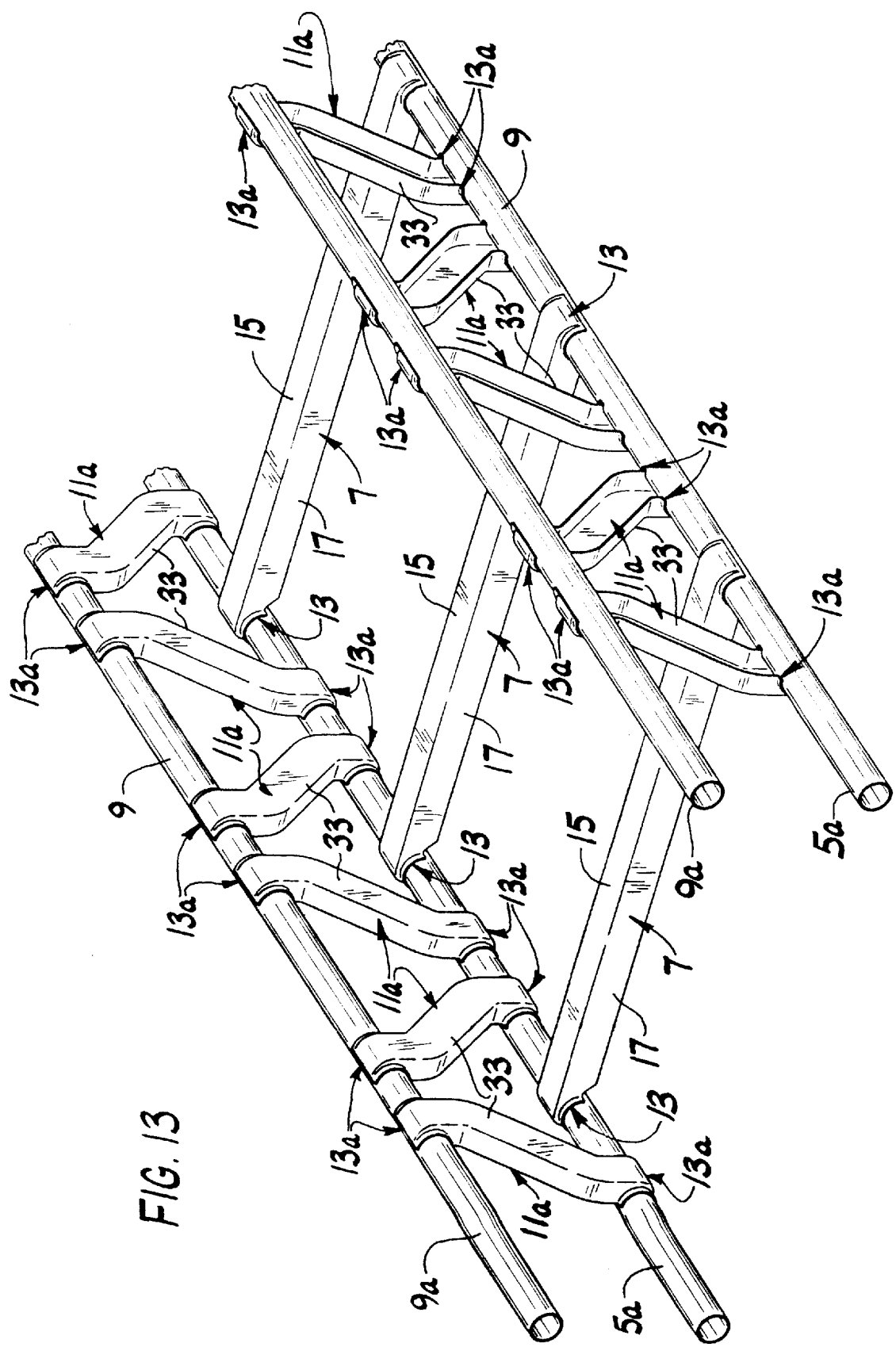
FIG. 13 is a perspective of a modification of the rack.

FIG. 13 shows a modification of the rack 3 in which the side members, designated 11a, instead of being straight from end-to-end like the side members 11 of the rack 3, have their ends with the formations 13a obliquely angled with respect to the reaches 33 of the side member between its ends, and in which the reaches extend obliquely instead of perpendicularly with respect to the tubes 9 and 11, successive members 11a being oppositely angled so that the side railings of the rack are generally triangulated in the formation of a Warren truss.

A support such as shown in FIG. 5 with a direction change may be constructed as illustrated in FIG. 14 wherein there is indicated the first straight rack 3 extending horizontally as indicated at H and the second straight rack 3 extending vertically as indicated at V, these racks being placed in position in which they are vertically coplanar (i.e. in which the central longitudinal planes of the racks are coplanar in a vertical plane) with the first rack at H extending in a first direction (horizontally as shown) and the second rack at V extending in a second direction (vertically as shown) diverging from the first. The ends 5e, 9e of the tubes 5 and 9 of the first rack (H) at one end thereof lie generally in a first plane P1 transverse to the first rack, and the ends 5, 9 of the tubes 5 and 9 of the second rack (V) at one end thereof lie generally in second plane P2 transverse to the second rack. These planes P1 and P2 intersect at an angle a, this angle being 90° as shown, it being understood that the racks may be placed with the planes P1 and P2 intersecting at angles other than 90°. To form the connections 5d and 9d as shown in FIG. 5 (indicated in phantom in FIG. 14) between the tubes 5 and 9 of the two racks, two tubes L1 and L2 of metal tubing of the same cross-section as tubes 5 and 9 are cut from straight tubing stock with tubes L1 each of such length as to be bent to extend from ends 5e of tubes 5 of the first rack (H) to ends 5 of tubes 5 of the second rack (V), and tubes L2 each of such length as to be bent to extend from ends 9e of tubes 9 of the first rack (H) to ends 9 of the tubes 9 of the second rack (V). The bending of tubes L1 and L2 may be expeditiously carried out on the job using a conventional tube bending tool. Tubes L1 are coupled at their ends to the ends 5e of tubes 5 of the racks and tubes L2 are coupled at their ends to the ends 9e of tubes 9 of the racks by coupling 31 as above described. As shown, with angle α 90° tubes L1 and L2 are bent to extend around an arc of 90° with straight end portions for facilitating application of the couplings 31. Generally, tubes L1 and L2 are bent to fit in place before coupling at either end, although it is within the contemplation of the invention that they could be coupled in place at one end before bending and then bent, followed by coupling at the other end. It will be understood that this phase of the invention may involve a method wherein only at least two but not all of the tubes 5 and 9 may be interconnected, e.g. only tubes 5 of successive racks may be interconnected by bent lengths L1.

FIGS. 15 and 16 illustrate steps in the aforesaid method of the invention for dual utilization of the racks involving enclosure of cable in one or more of the tubes 5, 9 of the racks as well as laying cable on the cross-members of the racks. This method is made possible by the use of couplings such as the couplings 31 shown in detail in FIGS. 12A and 12B which are free of obstruction to the bores (indicated at B in FIGS. 15 and 16) of the tubes 5 and 9 of the racks. In this regard, it will be observed that the internal annular flange 37 of coupling 31 against which the ends of the tubes abut have an internal diameter no greater than the internal diameter of the tubes, and thus lies clear of the bores of the tubes. As shown, cable C1 is that which is laid on the cross-members of the racks. Cable C2 is inserted in one or more of the tubes comprising tubes 5, 9 which extend throughout the length of the support with cable C2 extending longitudinally therethrough as permitted by nonobstruction of the bores of the tubes by the couplings 31. As illustrated this insertion may be effected by threading a line 47 through the series of tubes such as the series of tubes 9 (see FIG. 15), attaching cable C2 to one end of each line 47 as indicated at 49, and pulling the line 47 through the tubes to pull cable C2 through the tubes (see FIG. 16). This enclosure of cable C2 in the tubes as well as cable C1 laid on cross-members 7 is illustrated in FIG. 6.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A support for electrical cable comprising:
   a series of elongate racks connected together end-to-end;
   each rack comprising a pair of elongate lower members extending in parallel spaced relation longitudinally with respect to the rack at opposite sides thereof;
   cross-members extending transversely with respect to the rack between said lower longitudinal members spaced at intervals along the length of the rack and holding said lower members in said parallel spaced relation;
   said cross-members serving to support cable laid thereon;
   a pair of elongate upper members extending in parallel spaced relation longitudinally with respect to the rack above said lower members;
   side members extending between the lower and upper longitudinal members spaced at intervals along the length of the rack and holding said upper members in parallel relation to the lower members spaced above the lower members;
   each of said lower and upper longitudinal members comprising a metal tube of circular cross-section;
   each of said cross-members being an elongate sheet metal member having a reach extending between the lower tubes formed so as to be stiffened against bending and having formations at opposite ends thereof with a part-circular contour fitted on and secured to the lower tubes;
   said side members and upper tubes forming railings at opposite sides of the rack for retaining cable on the cross-members;
   the racks being interconnected end-to-end by couplings which couple together adjacent ends of at least some of the tubes of successive racks in the series.

2. A support as set forth in claim 1 wherein each of said side members is an elongate sheet metal member having a reach extending between a respective lower tube and a respective upper tube formed so as to be stiffened against bending with formations at opposite ends thereof with a part-circular contour fitted on and secured to the respective lower tube and upper tube.

3. A support as set forth in claim 2 wherein each cross-member has end portions extending over and secured to the lower tubes.

4. A support as set forth in claim 3 wherein each of said side members has end portions extending on the inside of a respective lower tube and the inside of a respective upper tube and secured thereto.

5. A support as set forth in claim 3 wherein the formation at each end of each cross-member has a downwardly opening recess of part-circular shape matching the circular cross-section of the respective lower tube.

6. A support as set forth in claim 5 wherein the formation at each end of each side member has an outwardly opening recess of part-circular shape matching the circular cross-section of the respective tube.

7. A support as set forth in claim 5 wherein each cross-member is formed from a single piece of sheet metal that is bent to form wings extending laterally outwardly therefrom at each end thereof bounding the downwardly opening recesses, said wings being curved in correspondence with the recesses and fitting on the respective lower tubes.

8. A support as set forth in claim 7 wherein each side member is formed from a single piece of sheet metal that is bent to form wings extending laterally outwardly therefrom at each end thereof bounding the outwardly opening recesses, said wings being curved in correspondence with the recesses and fitting on the respective tubes.

9. A support as set forth in claim 1 wherein the cross-member is an elongate sheet metal member of channel shape in cross-section thereby having a web and side flanges, the side flanges having downwardly opening recesses at their ends of part-circular shape matching the circular cross-section of the lower tubes, each cross-member extending between the lower tubes with its web uppermost and its flanges extending downward, and with its ends extending over the lower tubes and interfitted therewith at said recesses in the side flanges.

10. A support as set forth in claim 9 wherein each side member is an elongate sheet metal member of channel shape in cross-section thereby having a web and side flanges, the side flanges having outwardly opening recesses at their ends of part-circular shape matching the circular cross section of the tubes, each side member extending between the respective lower and upper tubes with its web innermost and its flanges extending outward, and with its ends extending on the inside of the respective tubes and interfitted therewith at said recesses in the side flanges of the side member channels.

11. A support as set forth in claim 10 wherein each cross-member has wings formed integrally therewith of the sheet metal thereof extending laterally outwardly from the flanges bounding the recesses in the flanges, said cross-member wings being curved in correspondence with the recesses in the flanges of the cross-members and fitting on the lower tubes, and wherein each side member has wings formed integrally therewith of the sheet metal thereof extending laterally outwardly from the side member flanges bounding the recesses in the flanges of the side members, said side member wings being curved in correspondence with the recesses in the side member flanges and fitting on the respective tubes.

12. A support as set forth in claim 11 wherein the web of each cross-member has its ends bent to extend around the lower tubes and the web of each side member has its ends bent to extend around the lower and upper tubes.

13. A support as set forth in claim 11 wherein the wings are welded to the tubes.

14. A support as set forth in claim 1 wherein the couplings are tube couplings which couple together meeting ends of the lower and upper tubes of successive racks in the series, said tubes as coupled by said tube couplings defining bores which are free of obstruction for facilitating passage of cable through the bores from one rack to another.

15. A rack for supporting electrical cable comprising:
a pair of elongate lower members extending in parallel spaced relation longitudinally with respect to the rack at opposite sides thereof;
cross-members extending transversely with respect to the rack between said lower longitudinal members spaced at intervals along the length of the rack and holding said lower members in said parallel spaced relation;
said cross-members serving to support cable laid thereon;
a pair of elongate upper members extending in parallel spaced relation longitudinally with respect to the rack above the said lower members;
side members extending between the lower and upper longitudinal members spaced at intervals along the length of the rack and holding said upper members in parallel relation to the lower members spaced above the lower members;
each of said lower and upper longitudinal members comprising a metal tube of circular cross-section;
each of said cross-members being an elongate sheet metal member having a reach extending between the lower tubes formed so as to be stiffened against bending and having formations at opposite ends thereof with a part-circular contour fitted on and secured to the lower tubes;
said side members and upper tubes forming railings at opposite sides of the rack for retaining cable on the cross-members.

16. A rack as set forth in claim 15 wherein each of the side members is an elongate sheet metal member having a reach extending between a respective lower tube and a respective upper tube formed so as to be stiffened against bending with formations at opposite ends thereof with a part-circular contour fitted on and secured to the respective lower tube and upper tube.

17. A rack as set forth in claim 16 wherein each cross-member has end portions extending over and secured to the lower tubes.

18. A rack as set forth in claim 17 wherein each of said side members has end portions extending on the inside of a respective lower tube and the inside of a respective upper tube and secured thereto.

19. A rack as set forth in claim 17 wherein the formation at each end of each cross-member has a downwardly opening recess of part-circular shape matching the circular cross-section of the respective lower tube.

20. A rack as set forth in claim 19 wherein the formation at each end of each side member has an outwardly opening recess of part-circular shape matching the circular cross-section of the respective tubes.

21. A rack as set forth in claim 19 wherein each cross-member is formed from a single piece of sheet metal that is bent to form wings extending laterally outwardly therefrom at each end thereof bounding the downwardly opening recesses, said wings being curved in correspondence with the recesses and fitting on the respective lower tubes.

22. A rack as set forth in claim 21 wherein each side member is formed from a single piece of sheet metal that is bent to form wings extending laterally outwardly therefrom at each end thereof bounding the outwardly opening recesses, said wings being curved in correspondence with the recesses and fitting on the respective tubes.

23. A rack as set forth in claim 15 wherein each cross-member is an elongate sheet metal member of channel shape in cross-section thereby having a web and side flanges, the side flanges having downwardly opening recesses at their ends of part-circular shape matching the circular cross-section of the lower tubes, each cross-member extending between the lower tubes with its web uppermost and its flanges extending downward, and with its ends extending over the lower tubes and interfitted therewith at said recesses in the side flanges.

24. A rack as set forth in claim 23 wherein each side member is an elongate sheet metal member of channel shape in cross-section thereby having a web and side flanges, the side flanges having outwardly opening recesses at their ends of part-circular shape matching the circular cross section of the tubes, each side member extending between the respective lower and upper tubes with its web innermost and its flanges extending outward, and with its ends extending on the inside of the respective tubes and interfitted therewith at said recesses in the side flanges of the side member channels.

25. A rack as set forth in claim 23 wherein each cross-member has wings formed integrally therewith of the sheet metal thereof extending laterally outwardly from the flanges bounding the recesses in the flanges, said cross-member wings being curved in correspondence with the recesses in the flanges of the cross-members and fitting on the lower tubes, and wherein each side member has wings formed integrally therewith of the sheet metal thereof extending laterally outwardly from the side member flanges bounding the recesses in the flanges of the side members, said side member wings being curved in correspondence with the recesses in the side member flanges and fitting on the respective tubes.

26. A rack as set forth in claim 25 wherein the web of each cross-member has its ends bent to extend around the lower tubes and the web of each side member has its ends bent to extend around the tubes, and wherein the wings are welded to the tubes.

27. The method of constructing a support for electrical cable utilizing racks each comprising a pair of elongate lower members extending in parallel spaced relation longitudinally with respect to the rack at opposite sides thereof; cross-members extending transversely with respect to the rack between said lower longitudinal members spaced at intervals along the length of the rack and holding said lower members in said parallel spaced relation; said cross-members serving to support cable laid thereon; a pair of elongate upper members extending in parallel spaced relation longitudinally with respect to the rack above said lower members; and side members extending between the lower and upper longitudinal members spaced at intervals along the length of the rack and holding said upper members in parallel relation to the lower members spaced above the lower members; each of said lower and upper longitudinal members comprising a metal tube;
the method comprising:
placing two racks in coplanar position with a first of the two racks extending in a first direction and the second of the racks extending in a second direction diverging from the first;
the ends of the tubes of the first rack at one end thereof lying generally in a first plane transverse to the first rack and the ends of the tubes of the second rack at one end thereof lying generally in a second plane transverse to the second rack, said planes intersecting at an angle;
bending metal tubes of the same cross-section as the tubes of the racks to form tubular connections between said ends of at least two of the tubes of said first and second racks; and
coupling the ends of the tubular connections to said ends of the tubes of said first and second racks which they are to interconnect.

28. The method of claim 27 wherein the tubular connections are placed and coupled after the bending thereof.

29. The method of claim 27 wherein two metal tubes are bent to form tubular connections between said ends of the lower tubes of said first and second racks;

two metal tubes are bent to form tubular connections between said ends of the upper tubes of said first and second racks;

the ends of the first-mentioned tubular connections are coupled to said ends of the lower tubes of the first and second racks; and the ends of the second-mentioned tubular connections are coupled to said ends of the upper tubes of said first and second racks.

30. The method of claim 29 wherein the tubular connections are placed and coupled after the bending thereof.

31. The method of supporting electrical cable comprising:

preparing a support comprising a series of elongate racks each comprising a pair of elongate lower members extending in parallel spaced relation longitudinally with respect to the rack at opposite sides thereof; cross-members extending transversely with respect to the rack between said lower longitudinal members spaced at intervals along the length of the rack and holding said lower members in said parallel spaced relation; said cross-members serving to support cable laid thereon; a pair of elongate upper members extending in parallel spaced relation longitudinally with respect to the rack above said lower members; side members extending between the lower and upper longitudinal members spaced at intervals along the length of the rack and holding said upper members in parallel relation to the lower members spaced above the lower members; each of said lower and upper longitudinal members comprising a metal tube of circular cross-section; the racks being interconnected in end-to-end relation by couplings which couple together adjacent ends of certain tubes, said tubes as coupled by said couplings defining bores which are free of obstruction;

laying cable on the cross-members of the racks; and inserting cable in one or more of the coupled-together tubes which extend throughout the length of the support, the inserted cable extending longitudinally therethrough from one rack to another rack as permitted by nonobstruction of the bores of the tubes by the couplings.

32. The method of claim 31 wherein cable is inserted in a tube which extends throughout the length of the support by threading a line therethrough, attaching the cable to one end of the line, and pulling the cable therethrough.

* * * * *